May 13, 1958
G. F. JUDE ET AL
2,834,562
AIRCRAFT AUTOMATIC PILOT
Filed Oct. 28, 1954
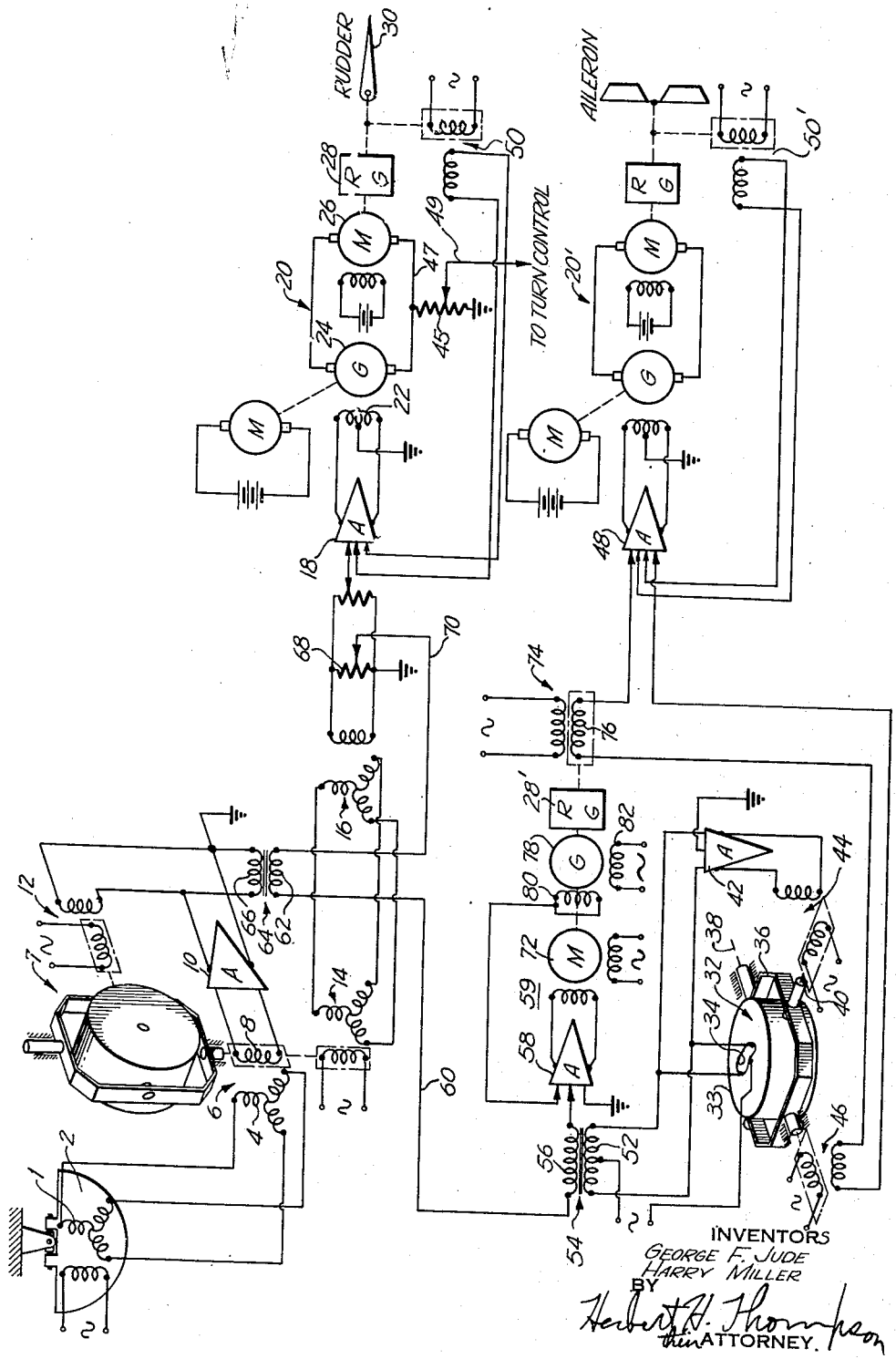
INVENTORS
GEORGE F. JUDE
HARRY MILLER
BY
Herbert H. Thompson
their ATTORNEY.

United States Patent Office 2,834,562
Patented May 13, 1958

2,834,562

AIRCRAFT AUTOMATIC PILOT

George F. Jude, Flushing, and Harry Miller, Brooklyn, N. Y., assignors to Sperry Rand Corporation, a corporation of Delaware Application October 28, 1954, Serial No. 465,332

8 Claims. (Cl. 244—77)

This invention relates to a means for preventing or minimizing an unusual azimuth-roll instability that has been found to exist in high speed aircraft piloted from gyroscopic bases monitored from some form of magnetic compass in azimuth and from a gravitational reference device in roll and pitch, especially when such aircraft is in high latitudes when on a northerly heading in north latitudes and a southerly heading in south latitudes. This instability or hunting error is negligible at moderate air speeds and ordinary latitudes, but it becomes increasingly troublesome at high latitudes at the high air speeds attained in jet propelled craft. Investigation has shown that these oscillations are due to an interaction of the following factors brought into play by acceleration forces.

(1) The magnetic deviation of the magnetic compass usually in the form of a flux valve transmitted to the slave gyroscope of the gyro magnetic compass unit, due to departure of the airplane's apparent vertical from the true vertical (due to turns or sideslip). Such a deviation causes the flux valve to sense the vertical component of the earth's magnetic field (which is large in high latitudes), giving an erroneous signal which is integrated by the resulting precession of the slaved directional gyro.

(2) Turns and sideslip also adversely affect the gyro vertical. By the nature of the erection system, the vertical spin axis is slowly directed into alignment with the airplane's apparent vertical (from the gravitationally responsive device), the error being integrated by the gyro. Hence the deviation of the apparent vertical from the true vertical tends to yield a spurious roll reference.

By our invention we have solved the problem for all headings by introducing correction signals, not in the gyro slaving and erection loops, but into the roll channel of the automatic pilot. These signals are proportional to the recurrent error displacements of the Gyrosyn and preferably also of the gyro vertical spin axes and of opposite polarity. This solution of the problem is complicated by the fact that the amount of deviation of the spin axis of neither the gyro vertical nor the Gyrosyn is physically determinable when the airplane is subjected to lateral accelerations. By our invention we obtain these quantities approximately by integrating over the period of the deviation (usually between one and three minutes) the output of the flux valve to give the azimuth error and preferably similarly integrating the output of the gravity controlled system of the gyro vertical, which may be a liquid level device, to obtain a measure of the roll error. We also introduce into the integrator a factor to take care of the steady-state outputs of the liquid level and flux valve required to keep the gyro vertical erect in the presence of gimbal friction, earth rate, etc., and to keep the directional gyro slaved to the magnetic north. A slow turning off course will otherwise result because of the steady voltage that exists at the input to the integrator from this cause. To correct this, we introduce a third corrective factor into the integrator, obtained from a continuing or persistent signal of the same sign at the input to the rudder servo channel or a heading indicator of longer duration than the hunting above described. Thus, the average hunting oscillation of the craft has a period on the order of a few seconds while the rate of drift of the gyro referred to above is only a few degrees an hour. In our system, all corrections are thus interposed into the control of the aircraft about its roll axis from the gyro pilot without disturbing the position of the two gyros themselves as controlled from their respective compass reference (the flux valve) and vertical reference (the liquid level). Fair results may be obtained by using only two of the three corrective integrated signals above described, namely, the first or slaving signal between the flux valve and directional gyro and the third or continuing input signal to the rudder servo, but by also using the second signal between the liquid level and gyro vertical, a quicker and deadbeat suppression of the sinusoidal yawing error may be secured.

Referring to the drawings, the single figure illustrates in diagrammatic form the rudder and aileron controls of a typical airplane automatic pilot, the elevator control being omitted for simplicity. The automatic pilot selected is of the general type known as the Sperry A–12 or E–4 automatic pilot similar to that shown in the prior patent to Halpert, No. 2,586,034, dated February 19, 1952, except that said patent does not show that the directional gyroscope is usually slaved to a form of magnetic compass known as the flux valve, as shown in the patent to Esval et al., No. 2,539,411, for Automatic Pilots, dated January 30, 1951.

In the accompanying drawing, the flux valve 1 is represented as universally and pendulously mounted in a half sphere 2 so that it normally lies horizontal on the craft. Since the output of the flux valve is in the form of an A. C. tricircuit, the relative strength of which varies with the position of the three legs in the earth's field and is similar to that of a selsyn transmitter or synchro, it is so represented with the output windings thereof connected to similar windings on the stator 4 of synchro generator 6, the rotor 8 of which turns with or is stabilized by the vertical ring on the directional or slaved gyroscope 7 to constitute a "Gyrosyn" compass. The rotor winding 8 has a single phase output, therefore, which varies in magnitude and sign with the disagreement in the azimuthal position of the slaved gyroscope and the flux valve. This output is passed through amplifier 10 to energize a torquer 12 acting about the horizontal axis of the gyroscope to precess the gyroscope slowly into the magnetic meridian. The azimuth position of the gyroscope on the craft is transmitted by the synchro transmitter 14 to the synchro generator 16 and the output thereof supplies the main input to amplifier 18 which governs the rudder servomotor system 20.

This system is represented as of the Ward-Leonard type as shown in the aforesaid Halpert patent. The variable output of the amplifier causes the strength of the current to vary in the field winding 22 of the generator 24 of the motor generator set, the output of the generator driving the motor 26 which turns the rudder 30 through reduction gearing 28.

Similarly, the gyro vertical 32 is slaved to the gravitational device 34 so that the spin axis remains vertical. The gyro vertical as shown is universally mounted by means of gimbal 36 journalled on fore and aft axis 38 on the craft, and which in turn journals the gyro case 33 on the lateral axis 40. Tilt of the gyro axis is detected by a gravitational-responsive device shown in this instance as a liquid level (such as a mercury or electrolytic bubble level), and has an output which varies in sign (phase) with the direction of tilt and in amount with the magnitude of the tilt. (See the patent to Haskins, No. 2,446,180 dated August 3, 1948, or the patent of F. D. Braddon, No. 2,729,107 dated January 3, 1956.) The output of the liquid level is amplified in amplifier 42 and supplied to a torquer 44 which exerts a torque about the lateral axis of the gyroscope to cause precession about the fore and aft axis, in other words, the roll axis. It will be understood that a similar level and erection device, not shown, are also provided about the pitch axis. A preferred form of liquid level is shown in the copending patent of J. J. Furst, No. 2,720,116 dated October 11, 1955, for Universal Gyro Vertical.

The position of the gyro in roll is transmitted from the synchro 46 to amplifier 48 similar to amplifier 18 to control the aileron servomotor system 20' which may be the same type as the rudder servomotor system. Each system is preferably provided with a positional follow-back from the rudder or aileron which may be supplied by the synchro 50 or 50', the output of which is fed back into the amplifier 18 or 48.

The rate of turn of the aircraft is adjusted so that sideslip is minimized at a given bank angle, producing a co-ordinated turn. This is accomplished by causing the rotor of synchro 16 to rotate at a rate determined by the turning rate of the aircraft and the rudder servo generator voltage, which is a measure of mis-co-ordination as shown in the copending application of Harry Miller, one of the joint applicants, Serial No. 471,991, referred to hereinafter. The electrical output of the rotor of synchro 16 is applied to the rudder and aileron channel of the automatic pilot to call for rudder movements which will result in co-ordinated turns. The crossfeed system is shown by a resistor 45 to ground connected to the lead 47 between the generator 24 and motor 26 and having a tap 49 which leads to a special crossfeed amplifier, one form of which is shown in the aforesaid Halpert patent and a preferred form in the aforesaid Miller application.

The system so far described is illustrative of a typical automatic pilot system using a magnetic compass reference and we will now describe our improvement which we add thereto to overcome the peculiar oscillatory or yaw error developed in high speed aircraft in high altitudes as hereinbefore outlined. It will be understood, however, that our invention may be applied to other types of magnetic compass references and automatic pilots using magnetic compass and vertical references or either of them.

As stated hereinbefore, we propose to overcome this phenomenon by corrective signals proportional to and of opposite sign to these errors in heading and roll caused by these circumstances. To obtain these error terms, we propose to integrate the outputs of the devices causing such error in the position of the gyros, i. e., the flux valve of the Gyrosyn and the gravitational device of the gyrovertical and to apply the combined integrated signal as a correction in the aileron servo system. The latter or roll error corrective signal is shown as obtained from the variations in the output of the liquid level by connecting the output thereof across a midtapped winding 52 of the transformer 54. The secondary winding 56 has its output fed into amplifier 58 of the integrating unit 59.

The azimuth reference error signal is introduced as a factor into transformer 54, secondary winding 56 thereof being supplied with additional current from the lead 60 in circuit with one winding 62 of a second transformer 64. The other winding 66 of transformer 64 is placed across the output of the amplifier 10, whose output varies with the changes in the flux valve output from norm so that a composite signal is fed into the amplifier 58 which is a combination of signals proportional to the roll reference error and azimuth reference error from norm and which is of the proper polarity to oppose the effect on the aileron channel of the error signals that are to be compensated for.

We also introduce a third factor into amplifier 58 to avoid balancing out the steady-state output necessary to compensate for the possible slow drift of the directional and vertical gyros. We do this by using a portion of any long continued rudder servo controlling signal of the same sign existing at the input to amplifier 18 which result is shown as secured by tapping a resistor 68 across the output winding of synchro 16 (the output of which is proportional to heading error) and connecting the tapped lead 70 to the aforesaid winding 62 of transformer 64.

These three signals are combined in amplifier 58 and are integrated by driving a motor 72 therefrom at a speed proportional thereto so that the motor rotates in the proper direction through a distance proportional to the strength, sign and duration of error signal, thus performing an integrating function. The motor is shown as driving a synchro transformer 74 whose output winding 76 is connected in series with the output of synchro 46 and fed into the amplifier 48 for the aileron servomotor.

To increase the accuracy of the speed control of the motor 72 and prevent hunting, I have shown a speed or anticipator generator 78 driven from the shaft of the motor having two quadraturely related field windings 80 and 82, so that a voltage is induced in the winding 80 proportional to the varying in sign with the speed and direction of rotation of the motor (by virtue of the rotation imparted to its rotor by the motor 72 and the constantly energized field winding 82). This is applied to the input of the amplifier 58 as a damping voltage for the purpose specified.

It will be seen, therefore, that in our improved system a correction is introduced into the aileron system whenever cyclic deviations from the magnetic heading and/or the true vertical are taking place. By this system a source of error is avoided which becomes serious under special conditions of flying on a northerly course in the northern hemisphere or southerly in the southern hemisphere with great air speed and at high latitudes, disturbing the normal behavior of the two gyroscopes as slaved respectively to the apparent magnetic meridian as indicated by the flux valve and the virtual vertical as indicated by the gravitational factor (in this instance the liquid level).

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. Thus, while we have described this invention as particularly for the purpose of overcoming hunting and other errors occurring in high speed aircraft operating in high latitudes, we wish it understood that our invention and especially certain subcombinations thereof are useful in overcoming hunting and other errors in aircraft piloted from gyroscopes slaved to a gravitationally responsive means and to a magnetic compass due to lateral acceleration forces of whatever cause or type. By lateral acceleration forces we mean to include all acceleration forces having a component perpendicular to the direction of gravity such as centrifugal force due to turns and sideslip and acceleration forces due to changes in air speed of the craft. However, claims directed broadly to the principle of correcting the attitude or reducing the hunting of an automatically piloted aircraft using a gyro vertical erected by a gravitational device, especially when following a radio defined or barometrically defined path, by integrating the error signal between the gravitational device and gyro and applying it to correct an attitude controlling surface of the craft, are reserved for the sole copending application of Harry Miller, one of the joint inventors hereof, Serial No. 471,991, filed November 30, 1954, for Aircraft Automatic Pilots, since said Harry Miller is the sole inventor of this subject matter. Thus, while we have illustrated our invention as applied to the correction of the signals controlling the servomotors of an automatic pilot, it is likewise applicable to the correction of the signals controlling a navigational indicator for the human pilot which operates from similar signals on the zero reading or null principle. Such a zero reading system is shown in the patent to Kellogg, No. 2,613,352 for Radio Navigation System, dated October 7, 1952.

What is claimed is:

1. A correction device for aircraft navigational system adapted for flight in high latitudes having rudder and aileron controlling servo systems including directional and vertical gyroscopes slaved respectively to a magnetic compass and a gravitational device through error signals, said servo system being controlled by departure of the craft from the heading and attitude defined by said gyroscopes, means for supplying a portion of the error signal between the magnetic compass and directional gyroscope to an integrator as a damping or correcting term, means for supplying a portion of a continuing signal of the same sign from said directional gyroscope to said rudder servo system to said integration to preserve long period gyro supervision, and means for introducing the output of said integrator as a correction into the control of the aileron servo system from said vertical gyroscope.

2. A correction device for automatic pilots in high latitudes having rudder and aileron controlling servo systems and directional and vertical gyroscopes slaved to a magnetic compass and a gravitational device, respectively, means for generating a signal upon error between said magnetic compass and slaved gyro for correcting the latter, means for generating a signal upon deviation of said vertical gyroscope from said gravitational device, means for generating a signal upon deviation of the craft's heading from that indicated by said gyro for the rudder servo system, means for combining and integrating a portion of each of said signals, and means for feeding said combined integrated signal as a corrective factor into said aileron servo system.

3. A correction device for automatic pilots having rudder and aileron controlling servo systems and directional and vertical gyroscopes slaved to a magnetic compass and a gravitational device, respectively, through error signals, means for integrating the error signals both between the magnetic compass and directional gyroscope and between the gravitational device and gyro vertical, and means for feeding said integrated signal as a corrective factor for said aileron servo system.

4. A correction device for automatic pilots as claimed in claim 3, also having means for mixing a portion of any continuing displacement signal of the same sign to said rudder servomotor with the said other error signals and introducing the combined signal into said aileron servo system.

5. A correction device for automatic pilots having rudder and aileron controlling servo systems and directional and vertical gyroscopes slaved to a magnetic compass and a gravitational device, respectively, means for generating a signal upon error between said magnetic compass and slaved gyro, means for generating a signal upon error between said gravitational device and gyro vertical, means for combining and integrating a portion of each of said signals, and means for feeding said integrated signal as a corrective factor into said aileron servo system.

6. A correction device for automatic pilots as claimed in claim 5, also having means for generating a signal from said directional gyroscope for controlling said rudder servo system, means for introducing a portion thereof into said integrator and introducing said last-named signal into said aileron servo system.

7. A correction device for automatic pilots having servo systems controlling the heading of the craft including a magnetic compass, a directional gyroscope, means for generating a signal upon error between the magnetic compass and gyroscope, means for exerting a slaving torque on said gyro controlled by said signal to keep the latter on the magnetic meridian, means for also integrating a portion of said signal, and means for feeding said integrated signal as a corrective factor into at least one of said servo systems for correcting the heading of the aircraft.

8. A correction device for automatic pilots having rudder and aileron servo systems controlling the heading and bank of the craft including a magnetic compass, a directional gyroscope, means for generating a signal upon error between the magnetic compass and gyroscope, means for exerting a slaving torque on said gyro controlled by said signal to keep the latter on the magnetic meridian, means for also integrating a portion of said signal, and means for feeding said integrated signal as a corrective factor into said aileron servo system for correcting the heading of the aircraft.

No references cited.

UNITED STATES PATENT OFFICE
CERTIFICATE OF CORRECTION

Patent No. 2,834,562                                                    May 13, 1958

George F. Jude et al.

It is hereby certified that error appears in the printed specification of the above numbered patent requiring correction and that the said Letters Patent should read as corrected below.

Column 3, lines 41 and 42, for "altitudes" read -- latitudes --; line 54, for "gyrovertical" read -- gyro vertical --; column 4, line 25, for "the", first occurrence, read -- and --.

Signed and sealed this 14th day of April 1959.

(SEAL)
Attest:

KARL H. AXLINE                                                ROBERT C. WATSON
Attesting Officer                                          Commissioner of Patents